US010451293B2

(12) United States Patent
Kobos

(10) Patent No.: US 10,451,293 B2
(45) Date of Patent: Oct. 22, 2019

(54) METHOD AND APPARATUS FOR INSTALLATION OF SURFACE-MOUNTED KITCHEN COOKTOP UNITS

(71) Applicant: WHIRLPOOL CORPORATION, Benton Harbor, MI (US)

(72) Inventor: Duane M. Kobos, Laporte, IN (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 23 days.

(21) Appl. No.: 15/392,420

(22) Filed: Dec. 28, 2016

(65) Prior Publication Data
US 2018/0180295 A1    Jun. 28, 2018

(51) Int. Cl.
  *F24C 15/10*   (2006.01)
  *B23P 19/04*   (2006.01)
  *A47B 77/02*   (2006.01)
  *A47B 77/08*   (2006.01)

(52) U.S. Cl.
  CPC .......... *F24C 15/108* (2013.01); *A47B 77/022* (2013.01); *A47B 77/08* (2013.01); *B23P 19/04* (2013.01); *A47B 2200/0009* (2013.01)

(58) Field of Classification Search
  CPC ...... F24C 15/10; F24C 15/102; F24C 15/108; A47B 77/00; A47B 77/04; A47B 95/00; A47B 96/07
  USPC ..... 219/452.11, 452.12, 460.1, 460.2, 461.1; 126/214 A
  See application file for complete search history.

(56) References Cited

U.S. PATENT DOCUMENTS

| | | | |
|---|---|---|---|
| 4,453,533 A * | 6/1984 | Scheidler ................ | H05B 3/74 126/211 |
| 5,190,026 A | 3/1993 | Doty | |
| 5,640,947 A | 6/1997 | Shute | |
| 7,429,021 B2 | 9/2008 | Sather et al. | |
| 8,070,110 B2 * | 12/2011 | Jones ........................ | E03C 1/33 248/200.1 |
| 8,356,367 B2 * | 1/2013 | Flynn ........................ | A47K 1/05 248/500 |
| 9,400,115 B2 | 7/2016 | Kuwamura | |
| 2007/0151019 A1 * | 7/2007 | Marr ........................ | E03C 1/33 4/633 |

FOREIGN PATENT DOCUMENTS

| | | |
|---|---|---|
| DE | 7242625 | 3/1973 |
| DE | 4228076 | 5/1993 |
| DE | 1020040009606 | 9/2005 |
| EP | 2070442 | 6/2009 |
| FR | 2712071 | 5/1995 |

* cited by examiner

*Primary Examiner* — Alexander M Valvis
(74) *Attorney, Agent, or Firm* — Price Heneveld LLP

(57) ABSTRACT

A concealed bridge assembly is provided for supporting adjacent lateral edges of cooktop units that are mounted in a kitchen countertop. The concealed bridge assembly can be used for traditional raised mounting of cooktop units or true-flush mounting of cooktop units. When used with traditional mountings, the concealed bridge assembly has a top that is sized to be flush with the countertop surface and the approximate length of the countertop opening. If true-flush mounting is desired, the top of the concealed bridge assembly is flush with the top surface of a kerf cut in the countertop.

8 Claims, 17 Drawing Sheets

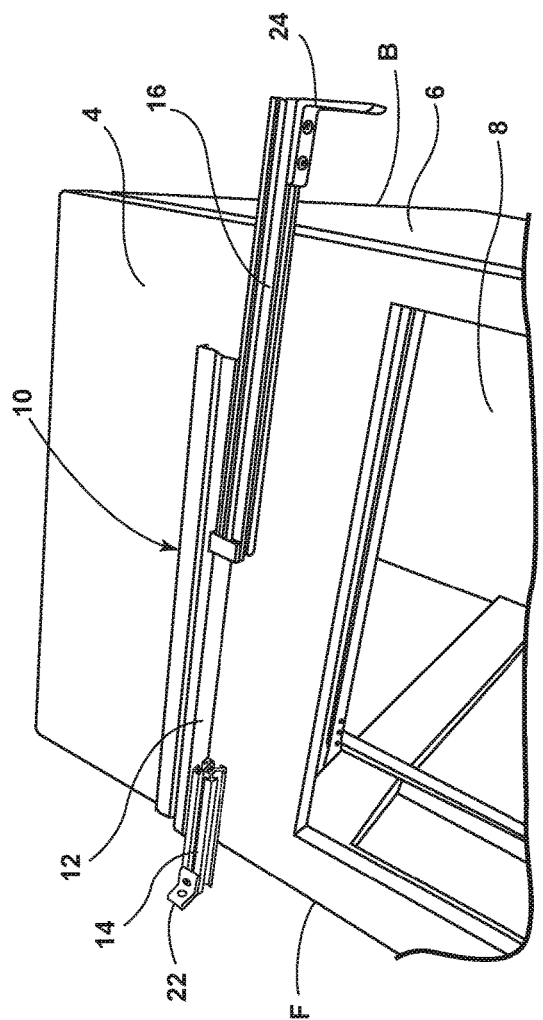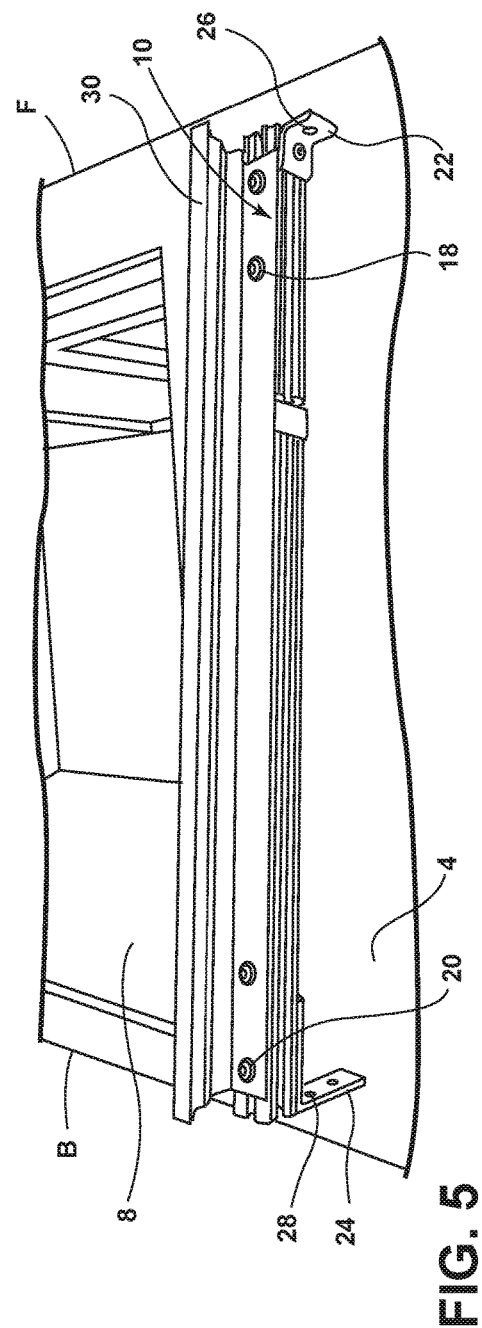
FIG. 4
FIG. 5

METHOD AND APPARATUS FOR INSTALLATION OF SURFACE-MOUNTED KITCHEN COOKTOP UNITS

BACKGROUND

The present disclosure generally relates to surface mounted kitchen cooktop units that can be mounted within an opening in a countertop. Such cooktop units are not attached to standalone appliances, but are inserted within an opening defined within the countertop surface. Such cooktop units are comprised of a surface of relatively thin dimension and of a housing of a relatively thick dimension. In order to support the cooktop unit, various mounting applications are typically disposed proximate the opening within the countertop in order to support the cooktop unit. FIG. 1 shows such an arrangement with the cooktop unit 100 mounted on a countertop 102 on a cabinet 104. The cooktop unit 100 is supported by brackets 106 that are secured to the cabinet 104.

Problems arise in the mounting and supporting of cooktop units in this manner. Typically, brackets are disposed and fastened along the inner edge of the opening in the countertop surface. One problem inherent to this design is with countertops that are a solid surface, including, but not limited to, natural stone, granite, marble, etc. Such dense materials resist conventional drilling of holes to which the brackets are attached. Grinding of the dense material to produce these holes is typically required and special hole-forming tools are needed. Further, the holes are placed into the relatively narrow face of the countertop opening and, as such, placed parallel to the top-most working surface of the countertop. Those holes and expanding fastener systems can act as stress concentration points that weaken or fracture the solid surface. Further, the natural formation of stone, granite, and marble materials leads these materials to be non-homogeneous in composition with veins of different material within the countertop slab(s). Although the appearance of non-homogeneous countertops is valued by customers, the relative differences in composition may cause a hole-forming tool to wander off the intended path for the fastener holes and lead to irregular, unaligned holes and/or lead to embedment of broken tools (such as drill bit tips) in the countertop. Even further, when a typical bracket requires the placement in multiple holes for attachment, there is an additional requirement that multiple holes be located a specified distance from each other. Those tolerances are difficult to achieve in such solid surfaces.

Problems also arise in alternate mounting and support designs that employ adhesive as adherent to affix one or more brackets disposed proximate the opening within the countertop. Environmental contaminants, such as ambient dust, countertop dust, oils, water, and/or finger oils can be present at the adhesive bond line surface, resulting in a sub-optimal and weak bond between bracket and countertop. Using adhesive on the face of the countertop opening's inner edge places the bond line of the adhesive into a shear force that arises from the weight load of the cooktop, cooking vessels, foods, and incidental contact. Adhesives do not resist shear forces well, especially over a long period of time.

Problems also arise in alternate mounting and support designs that employ a flanged bracket that is disposed proximate the opening and at the top-most corner of the opening. In these designs, a portion of the flange is positioned in contact with and parallel to the top surface of the countertop. The flange acts as a hanger structure to support the surface-mounted kitchen cooktop unit. However, a portion of the flange on the top surface of the countertop is visible unless the surface-mounted kitchen cooktop unit is designed to be installed as cover for the flange. The flange also precludes a manner of installation of the surface-mounted kitchen cooktop unit where the cooktop unit's top surface is completely flush to the countertop, which is greatly desired by high-end consumers.

Additionally, gaps that arise between structures—for example, a gap between underside of the countertop and the cabinet—represent an area that may allow localized bending movement of the countertop, and such bending of a natural stone, marble, and/or granite countertops may result in fracture of the countertop. In effect, none of the mounting applications above redirects or reduces the portion of the weight load impinging on the countertop.

When the cooktop unit has a planar surface and multiple brackets are disposed proximate the opening within the countertop in order to support the cooktop unit, care must be taken to ensure that the cooktop unit is level. When the number of supporting brackets exceeds three in number, the brackets do not contribute to a three-point definition of a plane, and the excessive brackets may cause the cooktop unit to be installed in a warped and out-of-plane condition. The inclusion of screw height adjustment mechanisms in the brackets presents a multiple-point adjustment challenge to an installer by requiring a plurality of adjustments to achieve a plane, and this adjustment is typically required to be performed from the underside of the cooktop unit after the cooktop unit is placed into the opening within the countertop.

When multiple cooktop units are in a side-by-side configuration, there is a line of contact between defined by edges of adjacent cooktop units. These edges are not supported by the above-described arrangements, and may result in misalignment of the edges of adjacent cooktop units. Thus, the need exists for a system for supporting cooktop unit(s) that results in proper alignment and proper support of the cooktop unit(s) in any type of countertop.

BRIEF SUMMARY OF THE INVENTION

One aspect of the present invention is a surface mounted cooktop. At least one cooktop unit is received in an opening sized to receive the cooktop unit(s) within the surface. A bridge assembly supports at least one surface of the cooktop unit. The bridge assembly includes a first beam with a length to proximately match the width of the opening in the surface and a height that is equal to or greater than the thickness of the surface. The bridge assembly also includes a second and third beams that are adjacent to and in sliding contact with the first beam. Fasteners are used for securing the bridge assembly underneath the surface.

Another aspect of the present invention is a bridge assembly for supporting one or more cooktop units. The bridge assembly includes a first beam with a length to proximately match the width of the cooktop unit and at least one plate on the first beam. The bridge assembly also includes a second beam that is adjacent to and in sliding contact with the first beam, having at least one groove that receives at least one plate from the first beam. The bridge assembly also includes a third beam adjacent to and in sliding contact with the first beam, with at least one groove that receives at least one plate on the first beam. Fasteners secure the second and third beams to surfaces underneath the cooktop unit.

Yet another aspect of the present invention is a method for installing and supporting a surface mounted cooktop units.

The method includes selecting one or more cooktop units for placement within an opening in a countertop. A bridge assembly is positioned underneath adjacent surfaces of cooktop units. The bridge assembly includes a first beam with a length to proximately match the cooktop units, and second and third beams adjacent to and in sliding contact with the first beam. The method includes securing the second and third beams to surfaces underneath the cooktop units.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 4 is a partial top perspective view of a bridge assembly, turned on its side, according to an embodiment of the present installation prior to installation in a cabinet;

FIG. 5 is a partial top perspective view of the bridge assembly, rotated to a vertical position, prior to installation in an opening in a countertop;

DETAILED DESCRIPTION OF THE PREFERRED EMBODIMENTS

Figure 1:
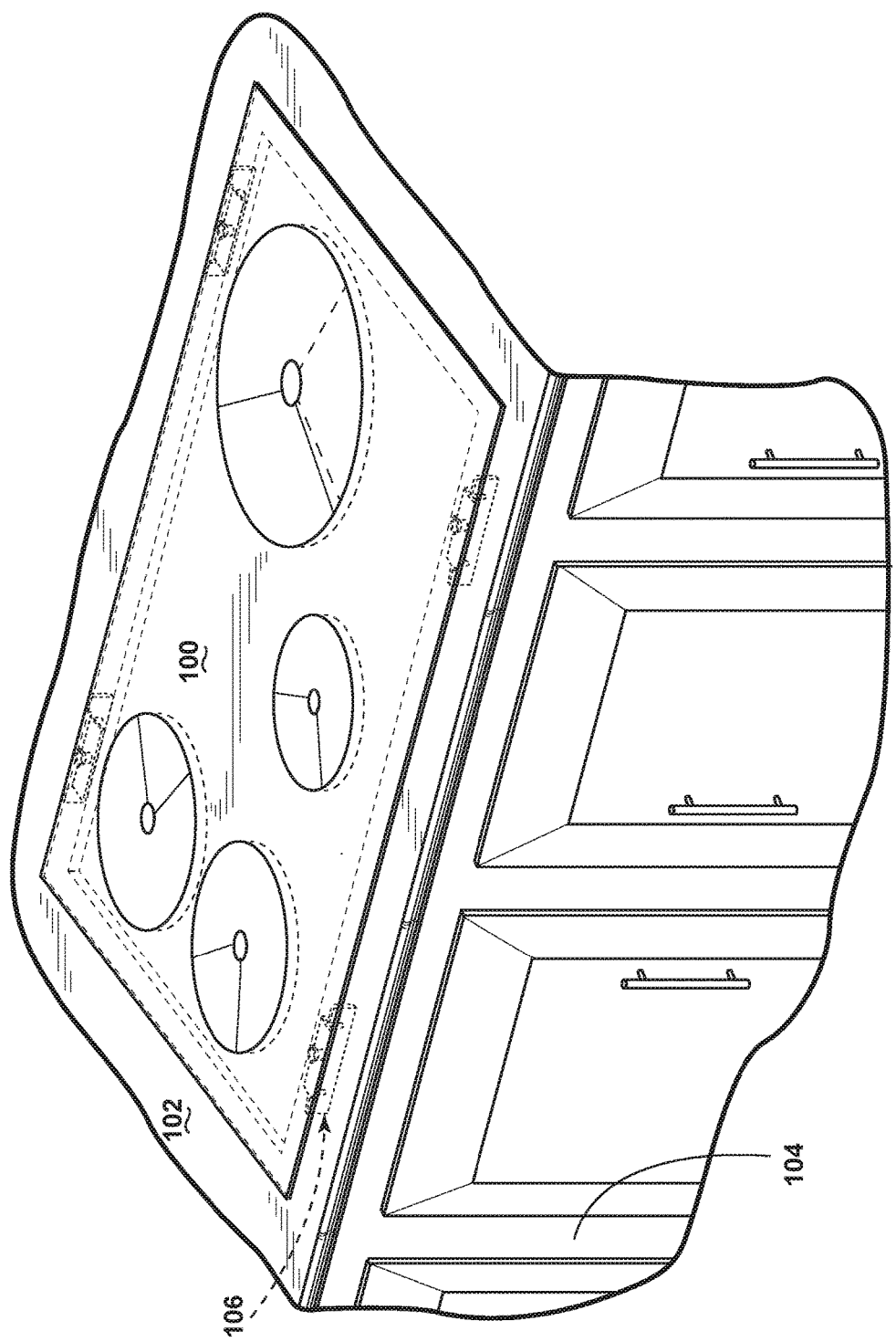
FIG. 1 is a prior art example of a cooktop installed in a countertop using brackets.

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in the Figures. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

In this specification and the appended claims, the singular forms "a," "an," and "the" include plural reference unless the context clearly dictates otherwise.

For purposes of this disclosure, the term "coupled" (in all of its forms, couple, coupling, coupled, etc.) generally means the joining of two components (electrical or mechanical) directly or indirectly to one another, including, but not limited to, through the use of fasteners, other mechanical fasteners, adhesives, etc. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Figure 2:
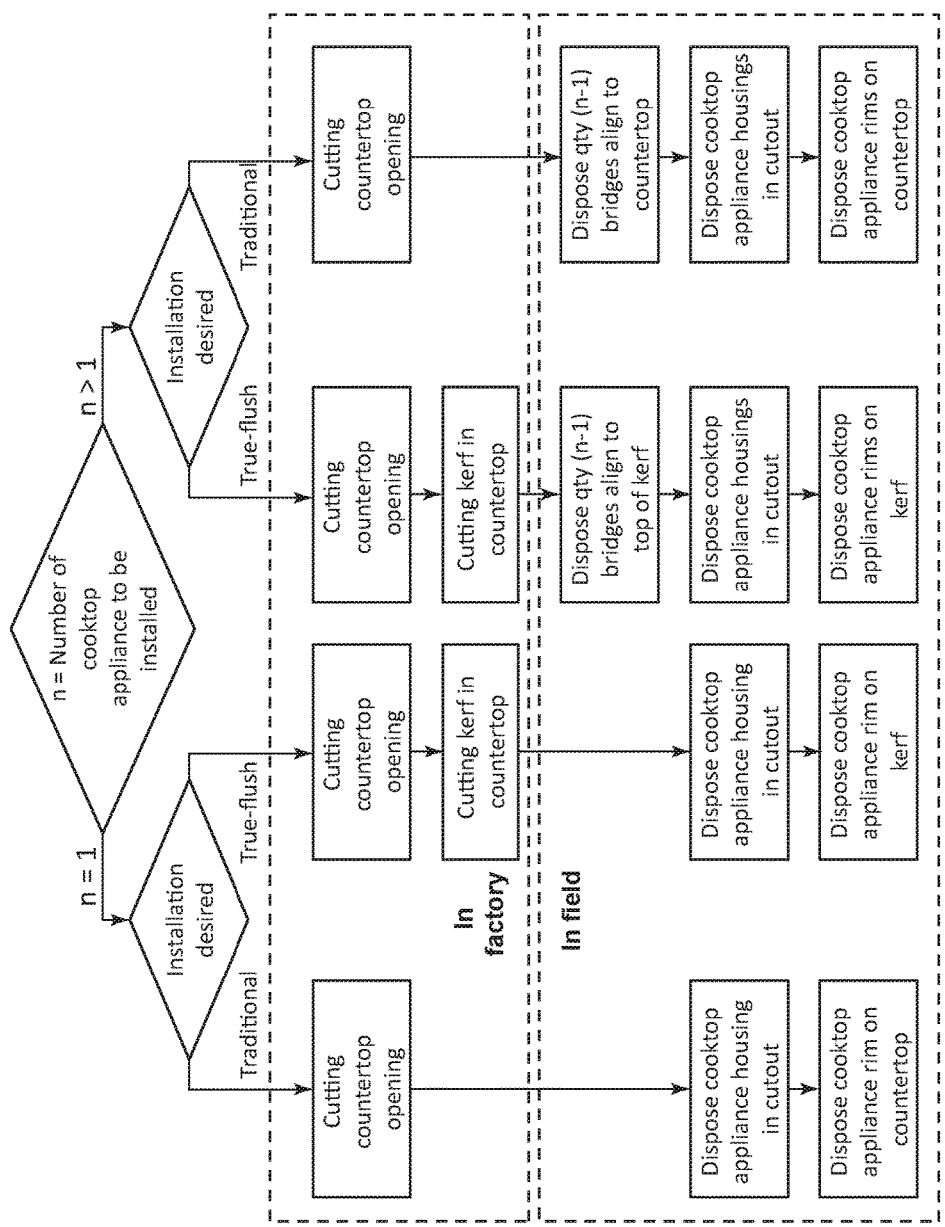
FIG. 2 is a diagram showing installation options for cooktops according to an embodiment of the present invention.
Figure 3:
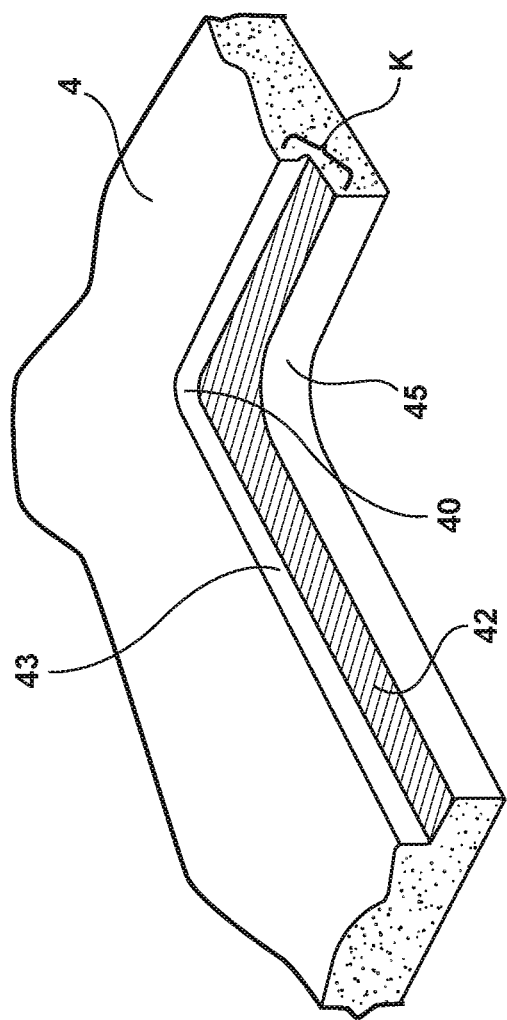
FIG. 3 illustrates a kerf (K) cut into a countertop.

With reference to the drawings, FIG. 2 illustrates a method of installing a plurality of cooktop units in a kitchen. The method provides for a true-flush installation of the cooktop units wherein the topmost surface of the cooktop unit rests in substantial alignment, i.e., substantially flush with the topmost surface of the countertop. This true-flush installation is achieved by creating a cutout with an associated kerf(s) which is a step(s) formed in the countertop. As illustrated in FIG. 3, the kerf K includes a top surface which acts as a ledge 42 to support a portion of the cooktop unit and a radius 40. The ledge 42 of the kerf K is thus proximal to the cutout opening in the countertop. The dimensions and shapes of the kerf(s) is substantially the same as the relative dimension of the cooktop unit. Ideally, the edges of the cooktop unit will closely fit the outside shoulder 43 of the kerf such that very little to no portion of the ledge 42 of the kerf is visible when looking down onto the countertop and cooktop unit(s). While FIG. 2 illustrates certain steps taking place in a factory and certain steps taking place in the field, it should be understood that all the steps can take place in either location. For example, the cutting of the countertop can take place in the field.

In addition to providing support for the cooktop in a true-flush installation, the ledge 42 of the kerf K provides a natural lower backer surface for sealant, such a silicone caulk, that can be used to fill the gaps between the edge of the cooktop and the shoulder 43 of the kerf K. The corner radius 40 of the kerf K in the countertop for the true-flush installation is not physically dependent upon the corner radius 45 of the cutout in the countertop. The dimensions and shapes of the kerf is independent of the opening defined within the countertop surface. This provides an advantage in that the corner radius 45 of the cutout in the countertop can be sized to a relatively larger radius to prevent stress concentrations as corresponds to a smaller radii. This provides the further advantage in that the corner radius 40 of the kerf and the countertop for true-flush installation can be sized to substantially match the radius of the corner of the cooktop.

The method also includes a traditional installation wherein the cooktop unit is installed into an opening of a countertop without using a kerf. The upper surface and rim of the cooktop rests on top of the top surface of the countertop.

Both true-flush and traditional installation methods utilize the entire periphery of the opening within the countertop in order to support the cooktop unit(s), avoiding stress concentration points. This method also eliminates the need for the creation of holes in the countertop, which makes installation easier and avoids potential damage to countertops and, in particular, countertops that are natural stone, marble, or granite.

Figure 18:
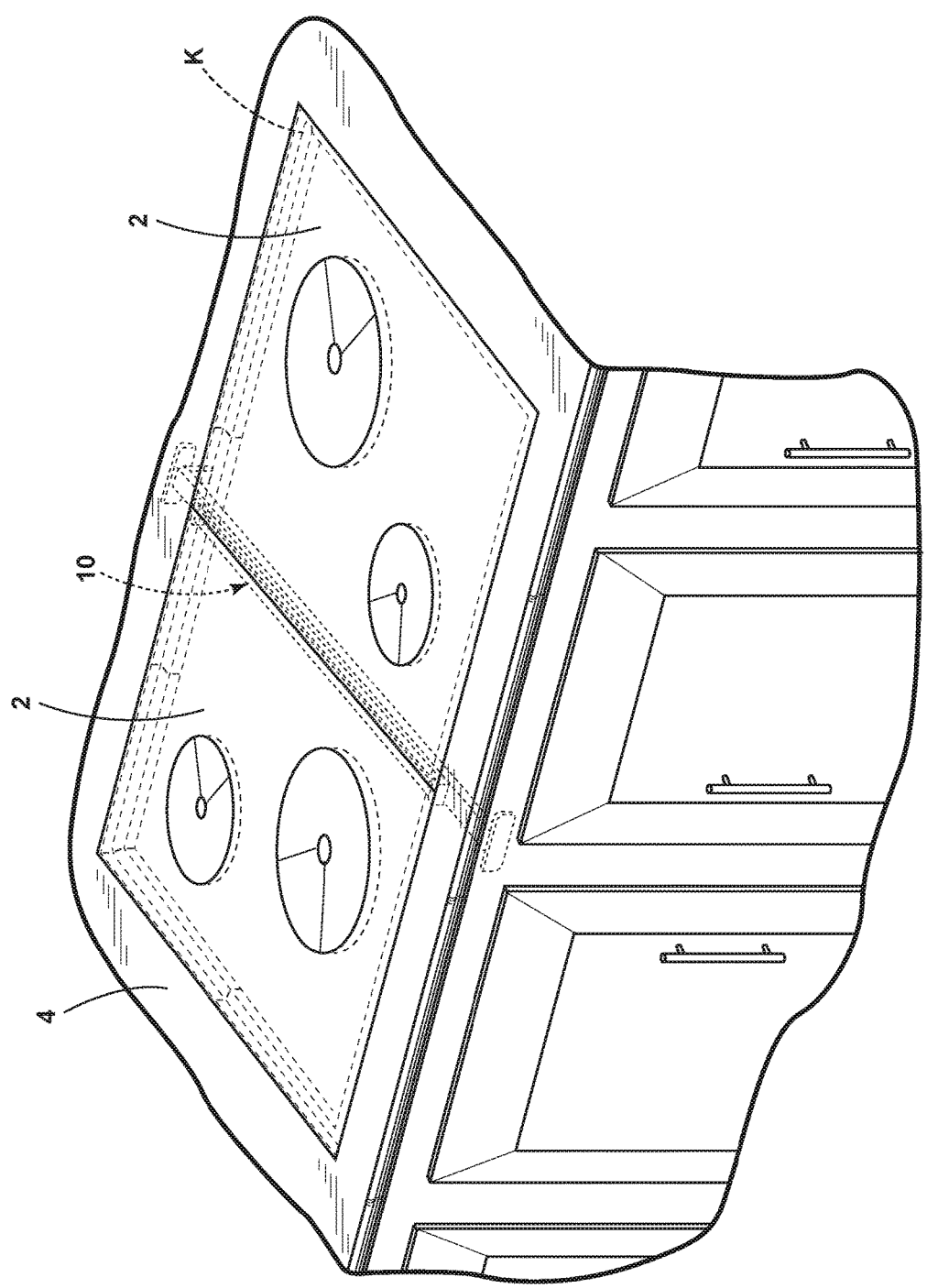
FIG. 18 is a partial fragmentary perpendicular view of two adjacent cooktop units installed with the bridge assembly in a cabinet.

When two or more cooktop units are installed in a side-by-side configuration, the countertop cutout methods may be combined with a concealed bridge assembly 10 for mounting and supporting two or more cooktop units. As illustrated in FIG. 18, two cooktop units 2 are supported both by a kerf K in a true-flush installation and a concealed bridge assembly 10. While this illustrated example shows a single concealed bridge assembly 10, it should be understood that any quantity of concealed bridge assemblies 10 may be employed so as to match and support any quantity of cooktop units 2 installed into a countertop opening 8.

Each single concealed bridge assembly 10 supports edges of two adjacent cooktop units 2. Since the concealed bridge assembly 10 is located under the line of contact between and defined by two lateral edges of the cooktop units 2, any gaps between the line of contact that would allow a view of the cabinet space below the cooktop unit is blocked by the top surface 30 of the concealed bridge assembly 10. In addition, the top surface 30 of the concealed bridge assembly 10 can be any color, including a color that matches the color of the cooktop unit. The top surface 30 of the concealed bridge assembly 10 provides a natural lower backer surface for sealant, such as silicone caulk, that can be used to fill any gaps between the lines of contact defined by adjacent edges of two cooktop units 2. The concealed bridge assembly 10 eliminates the need for brackets to support the cooktop units and avoids stress concentration points on the countertop surface.

The concealed bridge assembly 10 includes a first beam 12, a second beam 14, and a third beam 16, as illustrated in FIGS. 4-5. While FIG. 4 shows the concealed bridge assembly 10 turned on its side, FIG. 5 illustrates the concealed bridge assembly 10 in an upright position. The combination of the first beam 12, the second beam 14, and the third beam 16 is also shown in FIGS. 11-17. The second beam 14 and the third beam 16 have respective grooves 32 and 34. As illustrated in FIG. 14, grooves 32, 34 have a cross section with slanted walls 91, 93 and a relatively flat top walls 95, 96.

Figure 15:
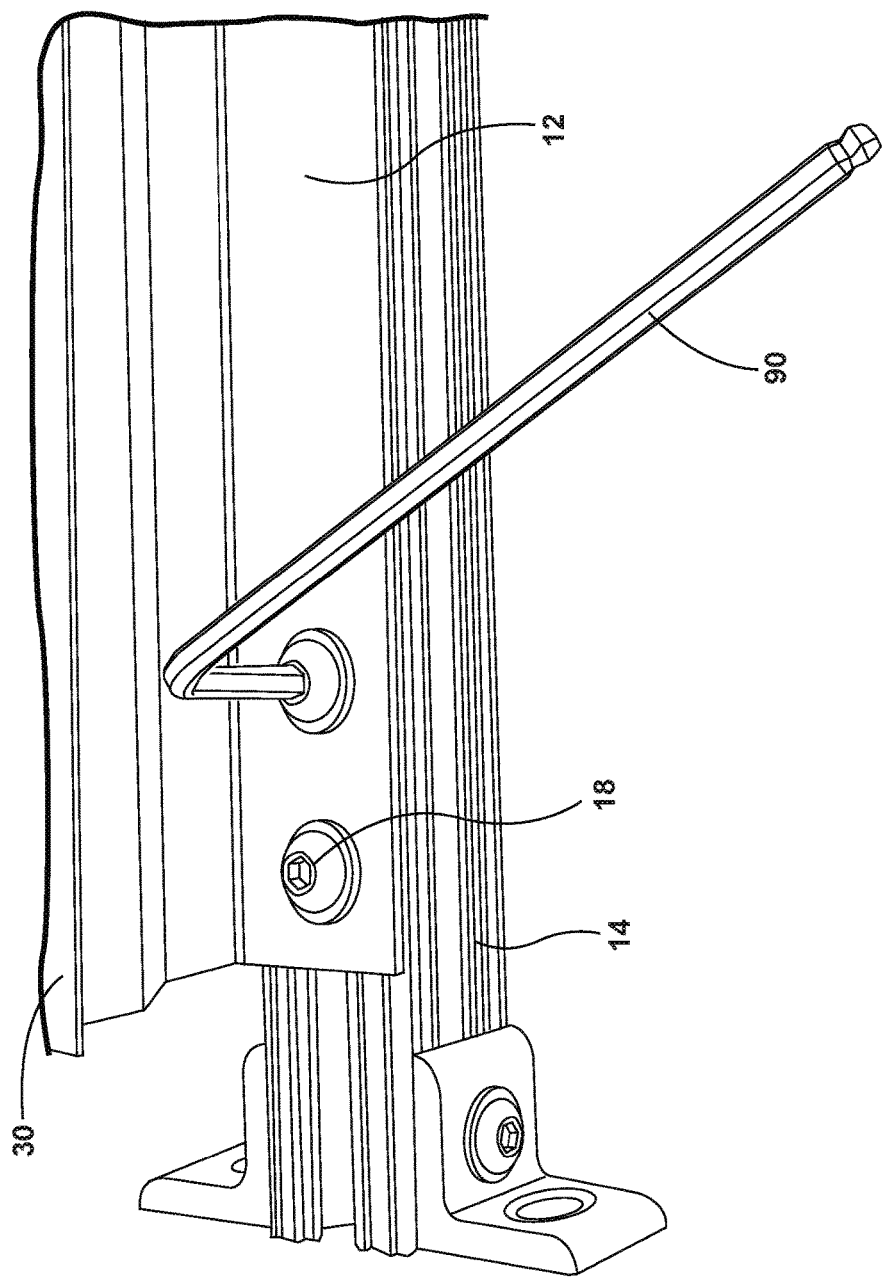
FIG. 15 is a top perspective view of the securement of the first and second beams.

The first beam 12 has a height H3, which is equal to or greater than the thickness of the countertop. The first beam 12 also has at least one plate 46, which is coupled to the first beam 12. That plate(s) 46 is received within the respective channels 32, 34 and the second beam 14 and third beam 16, respectively. In the illustrated example, a single front plate 46 is used and a single rear plate (not shown) is used. When the fasteners 18 are tightened, the plate 46 is drawn into contact with the top walls 95, 96 in the groove 32 of the second beam 14. As illustrated in FIG. 15, similarly, the rear plate (not shown) is drawn to the top walls 95, 96 of the groove 34 of the third beam 16 when the fasteners 20 are advanced. A hex tool 90 can be used to tighten the fasteners 18, 20 thereby drawing the plate(s) 46 against the walls 95, 96 of the grooves 32, 34 fixing the relative alignment of the first beam 12, second beam 14, and third beam 16.

Figure 17:
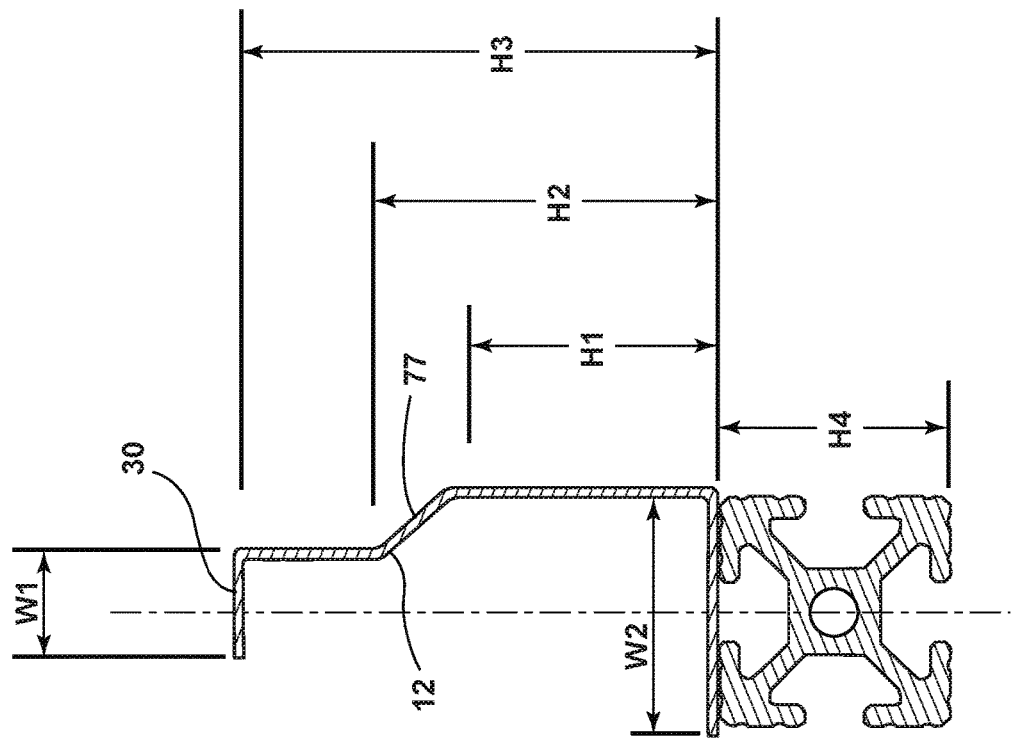
FIG. 17 is a cross-sectional view of the bridge assembly according to an embodiment of the present invention taken long line XVII as shown in FIG. 14.

The width W2 of the lower portion of the first beam 12 can be greater than width W1 of the top surface 30, as illustrated in FIG. 17. Similarly, the overall height H3 of the first beam 12 can include one or more bends 77 to help strengthen and to help center the top surface 30 of the first beam 12.

In the illustrated embodiment, width W1 is approximately ½ inch, while width W2 is approximately 1 inch. Height H1 is approximately ½ inch and height H2 is approximately 1.1 inch, while height H3 is approximately 2 inches. Height H4 is approximately 1 inch. Thus, in this particular embodiment, the concealed bridge assembly 10 could be used on a countertop 4 that has a thickness of 2 inches or less. This would permit connection of the second beam 14 and third beam 16 of the concealed bridge assembly 10 to the cabinet 6, as described above, while permitting the top surface 30 to support lateral edges of adjacent cooktop units 2.

Figure 6:
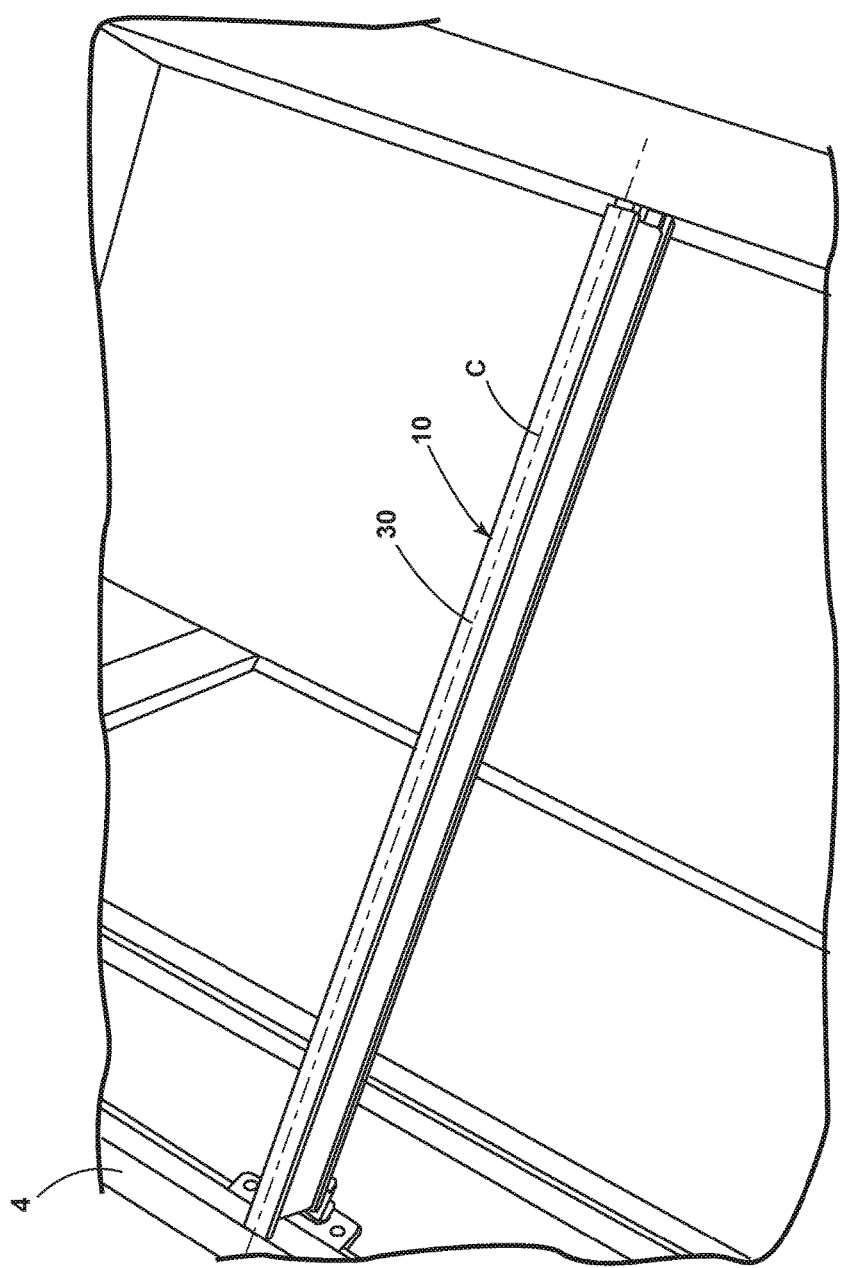
FIG. 6 is a partial top perspective view of the bridge assembly of FIGS. 4 and 5 placed inside an opening in a countertop.
Figure 7:
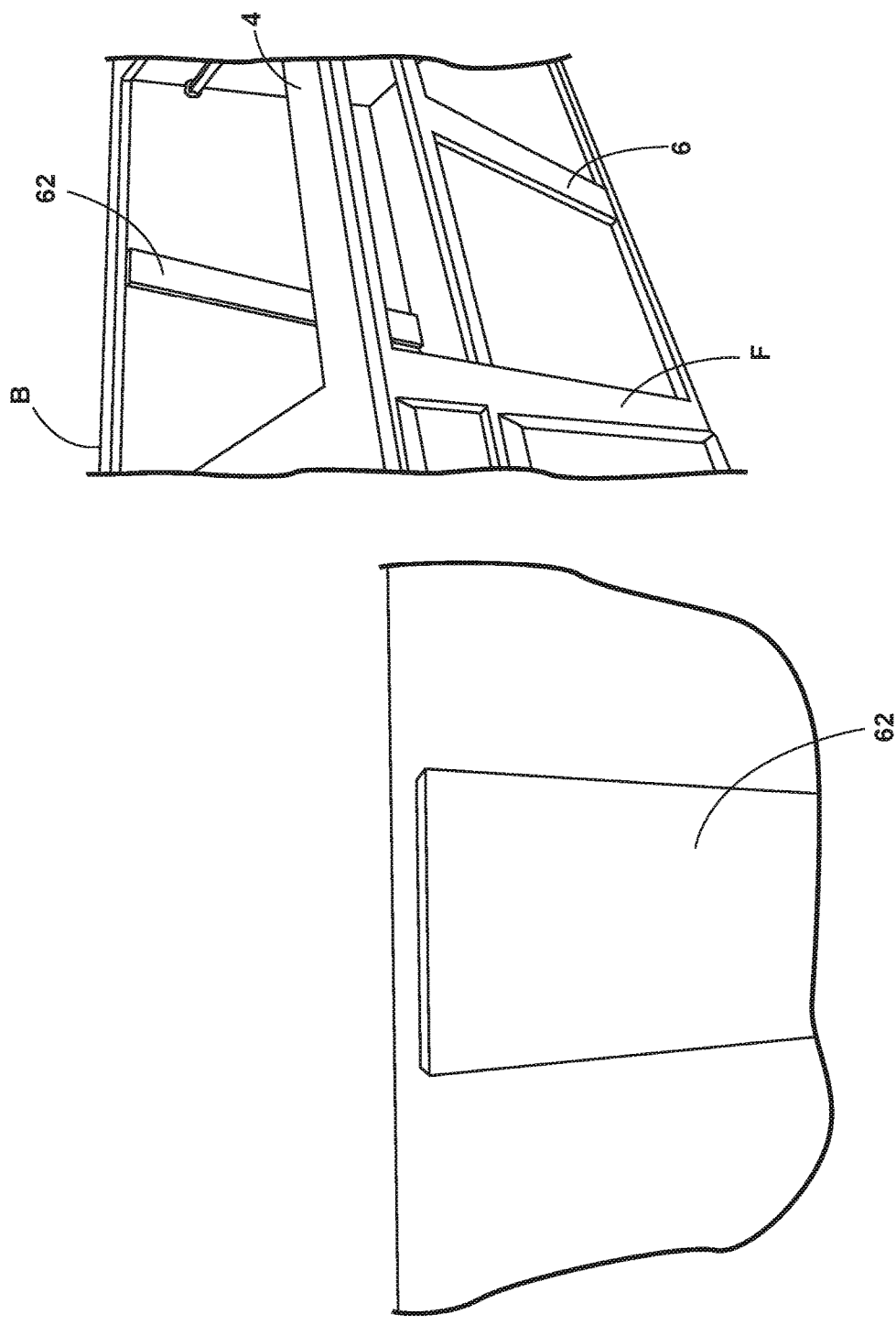
FIG. 7 illustrates optional front and back cleats that can be used in a cabinet.
Figure 8:
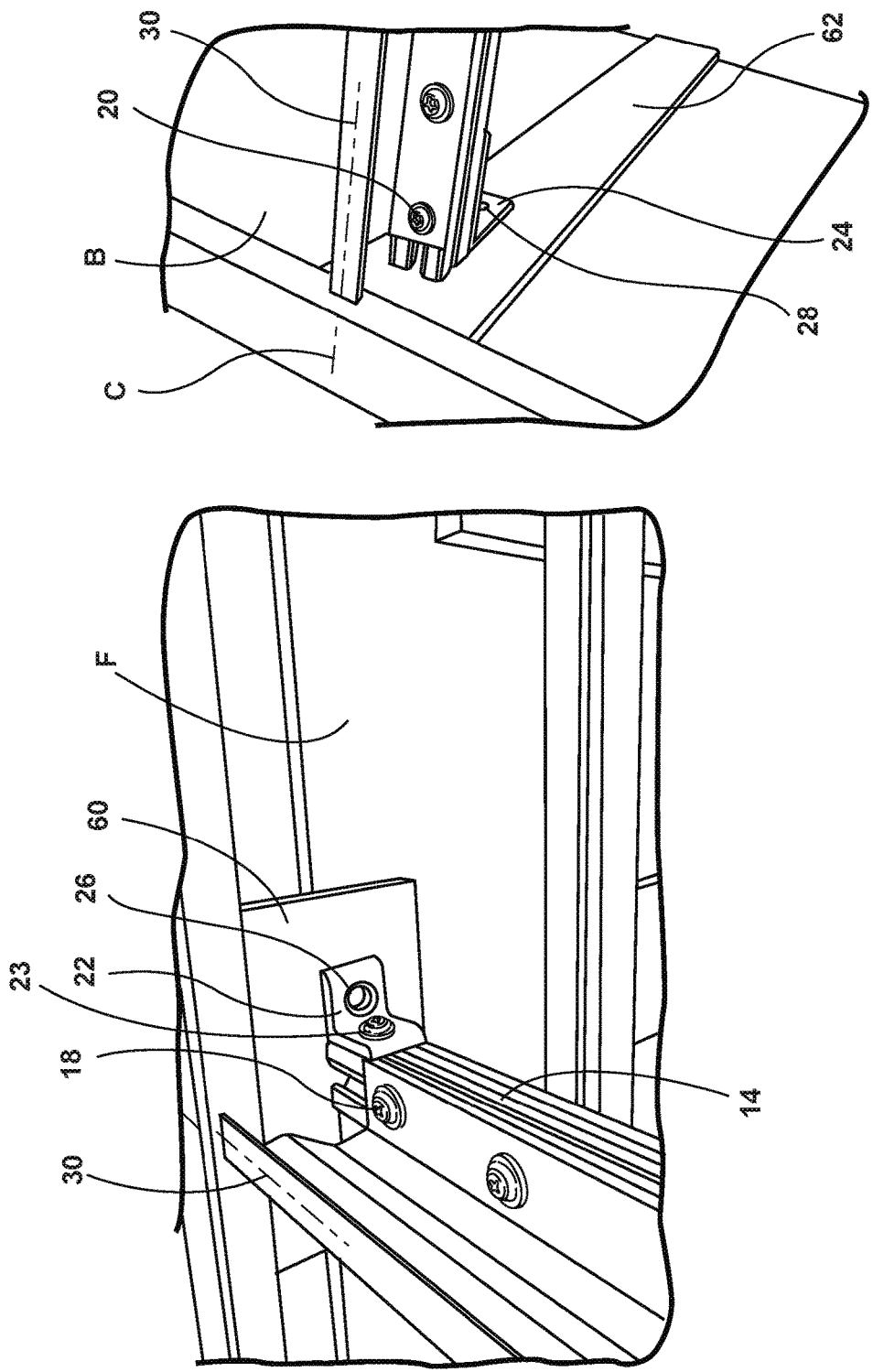
FIG. 8 is a top perspective view of the portions of the bridge assembly connected to the cleats on the front (F) and back (B) of the cabinet.

The concealed bridge assembly 10 is installed by fastening the second beam 14 and third beam 16 of the concealed bridge assembly 10 to the cabinet 6 bypassing attachment to the countertop 4, avoiding the problems of creating holes in the countertop 4. The concealed bridge assembly 10 may be fastened directly to the cabinet 6 and/or by use of reinforcing cleats added to the cabinet 6 to provide structural reinforcement to the cabinet 6. FIGS. 7-8 illustrate the use of reinforcing cleats. A front cleat 60 may be located on the front F of the cabinet 6 while a back cleat 62 can be located on the backside B of the cabinet 6. As illustrated in FIG. 8, the bracket 22 that is attached to the second beam 14 of the concealed bridge assembly 10 may be attached to the front cleat 60. The bracket 22 can be integrally formed with the second beam 14 or can be secured to the second beam 14 using a fastener 23. The bracket 22 includes an opening 26 through which a fastener (not shown) can be inserted to secure the bracket 22 to the cleat 60, which has been coupled to the front F of the cabinet 6. If no cleat is used, the bracket 22 is attached directly to the front F of the cabinet 6, as illustrated in FIG. 6. Adhesive may be used with or in place of the fasteners for securing the brackets 22, 24 and/or cleats 60, 62 to the cabinet 6.

The height at which the concealed bridge assembly 10 is installed within the cabinet 6 depends upon whether a true-flush or traditional mount is desired, the thickness of the countertop 4, and the thickness of the lateral edges of the cooktop units 2. Ideally, the top surface 30 of the first beam 12 of the concealed bridge assembly 10 is at a height to provide support for but not unnecessarily raise the lateral edges of the adjacent cooktop units 2.

The concealed bridge assembly 10 can be installed from the top side of the countertop 4 by the installer without the need for the installer to crawl into the cabinet 6. The top surface 30 of the concealed bridge assembly 10 can be aligned with the top edge of the countertop 4 (for traditional installation) or aligned with the ledge 42 of the kerf K (for true-flush installation) prior to installation of the cooktop unit(s) 2. Thus, the concealed bridge assembly 10 can be inspected to ensure that a substantially planar surface is provided by the concealed bridge assembly 10 and the countertop 4 and/or ledge 42 of kerf K.

Figure 9:
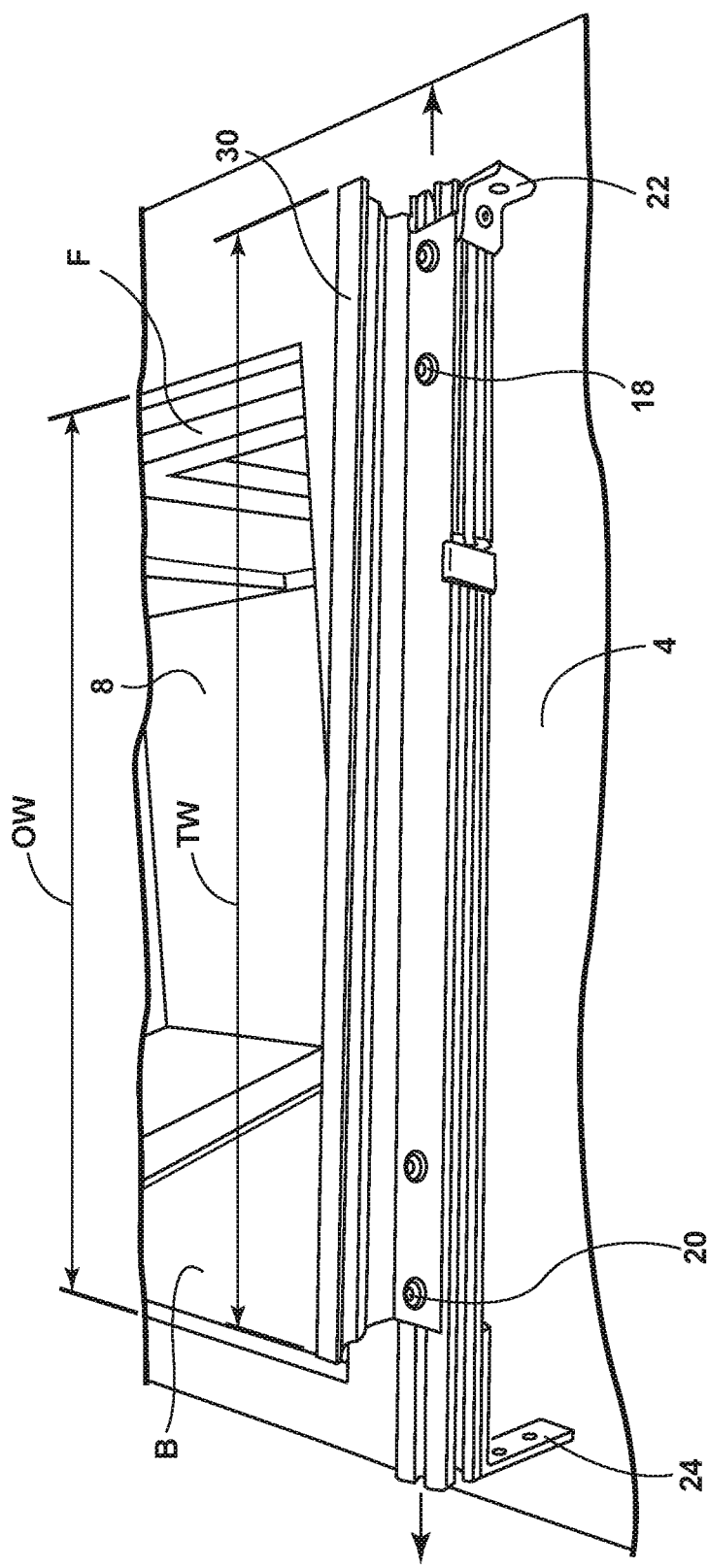
FIG. 9 is a top perspective view of the bridge assembly prior to installation in the opening in a cabinet.
Figure 10:
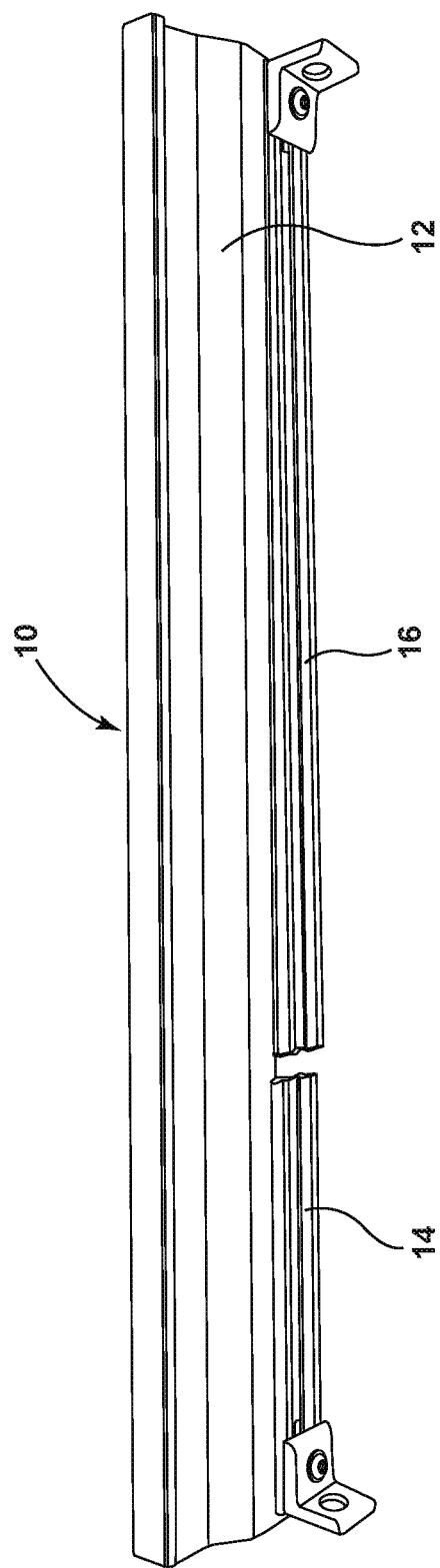
FIG. 10 is a side perspective view of the bridge assembly according to an embodiment of the present invention.
Figure 11:
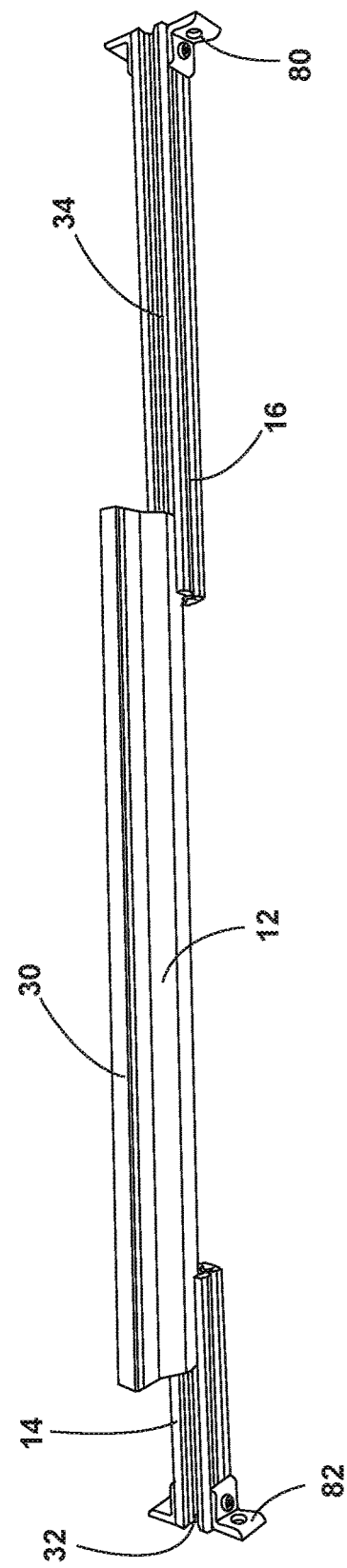
FIG. 11 is a side perspective view of the bridge assembly.

The first beam 12 should have a length to nearly match the front-to-back countertop cutout opening dimension and/or the front-to-back kerf opening. FIG. 9 illustrates a traditional mount where the countertop opening width OW is substantially the same as the top wall width TW of the top surface 30. Ideally, there would be minimal clearance between the cutout opening (and/or the top cutout/kerf opening) and the top surface 30 of the concealed bridge assembly 10 so as to provide the advantage of caulk backer and advantage of blocking views through the gaps between the line of contact defined by the adjacent edges of the cooktop units 2.

While a variety of brackets 22, 24 and 80, 82 have been illustrated in the drawings for securing the second beam 14 and the third beam 16 directly or indirectly to the cabinet 6, any type of bracket system, with or without adhesive, may be used to secure the second beam 14 and third beam 16 directly or indirectly to the cabinet 6. Additionally, other means of coupling the concealed bridge assembly 10 may be used.

The beams 12, 14, 16 of the concealed bridge assembly 10 can be formed metal and/or extruded metal. While the first beam 12 can come in a variety of standard sizes depending upon size of the cooktop units 2, the first beam 12 may be cut, prior to installation, to precisely fit the cutout/kerf opening. This may be needed, particularly in cases when the opening is not precisely cut and/or a kerf is used.

While the illustrated embodiment utilizes plates 46 with associated fasteners 18, 20 to secure the first beam 12, second beam 14, and third beam 16 together to form the concealed bridge assembly 10, any type of coupling can be used to affix the beams 12, 14, 16 in alignment and to the desired length.

Installation of the concealed bridge assembly 10 is accomplished by loosening the fasteners 18, 20, sliding the second beam 14 and the third beam 16 and brackets 22, 24 together and aligning the combined length of second beam 14, third beam 16 and brackets 22, 24 to be less than or equal to the length of the first beam 12 and to be on the same centerline C, as shown in FIG. 6. The concealed bridge assembly 10 is inserted into the countertop opening 8, and the top surface 30 of the first beam 12 is aligned to the surface of the countertop for traditional installations and, alternatively, to the ledge 42 of the kerf K for true-flush installation.

The second beam 14 is extended under the front edge of the countertop 4 to the inner face of the front F of the cabinet 6 or to the inner face with added support cleats 60, and the bracket 22 is fastened by using a fastener through fastener opening 26 to the inner face of the cabinet 6. The third beam 16 is extended under the rear edge of the countertop 4 to the back face of the cabinet 6 or to support cleats 62 and the bracket 24 is fastened with fasteners through opening 28. The fasteners 18, 20 are then tightened to affix relative alignment of the first beam 12, second beam 14, and third beam 16 and to prevent the relative sliding and/or tightening of the concealed bridge assembly 10. The order in which the second and third beams 14, 16 are extended and the fasteners are secured is not critical to the proper final installation.

Figure 16:
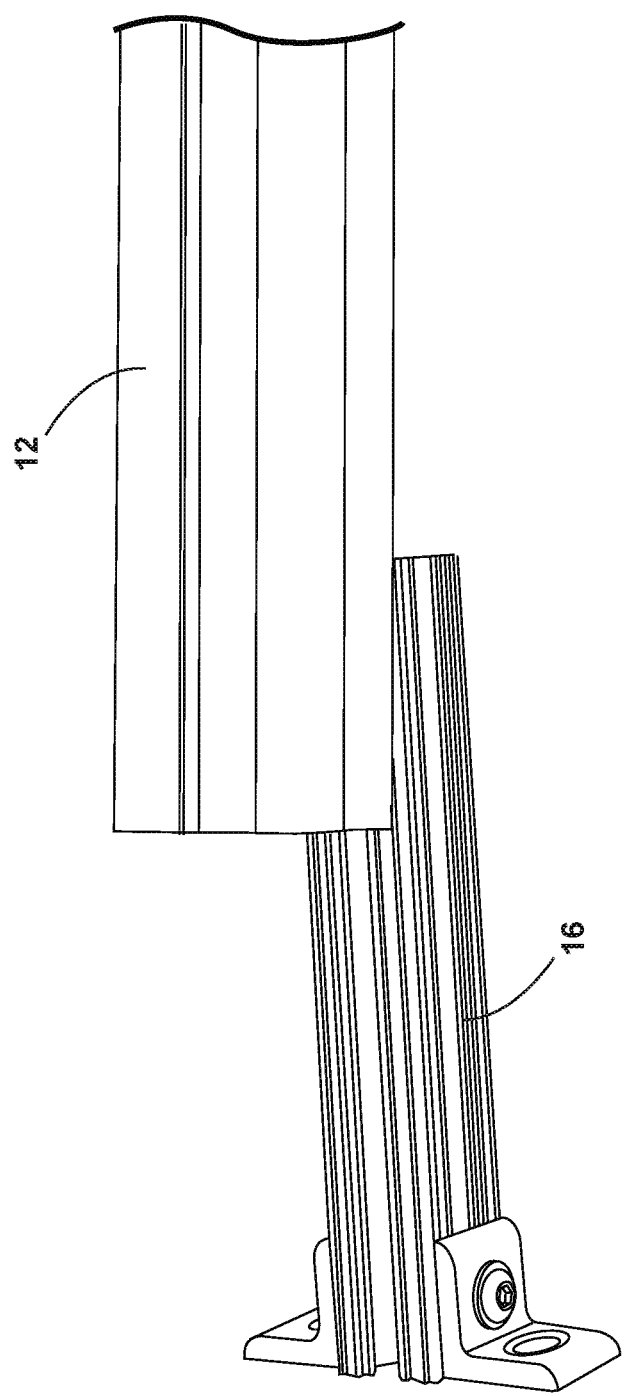
FIG. 16 is a side perspective view of the first and third beams.

A single concealed bridge assembly 10 supports adjacent edges of two adjacent cooktop units 2 with additional concealed bridge assemblies 10 being used to support additional cooktop units 2. When the front F and back B of the cabinets are not parallel or are not square, the second beam 14 and the third beam 16 can be rotated slightly as illustrated in FIG. 16 to allow for small, limited axial misalignment of the concealed bridge assembly 10 to accommodate such discrepancies between the front F and back B of the cabinets. In addition, the bottom edges of the concealed bridge assembly 10 can provide surfaces on which angled brackets and tension screws (not shown) may act to provide for the coupling of edges of adjacent cooktop units 2 to the concealed bridge assembly 10 to prevent upward movement of the cooktop units 2.

Figure 12:
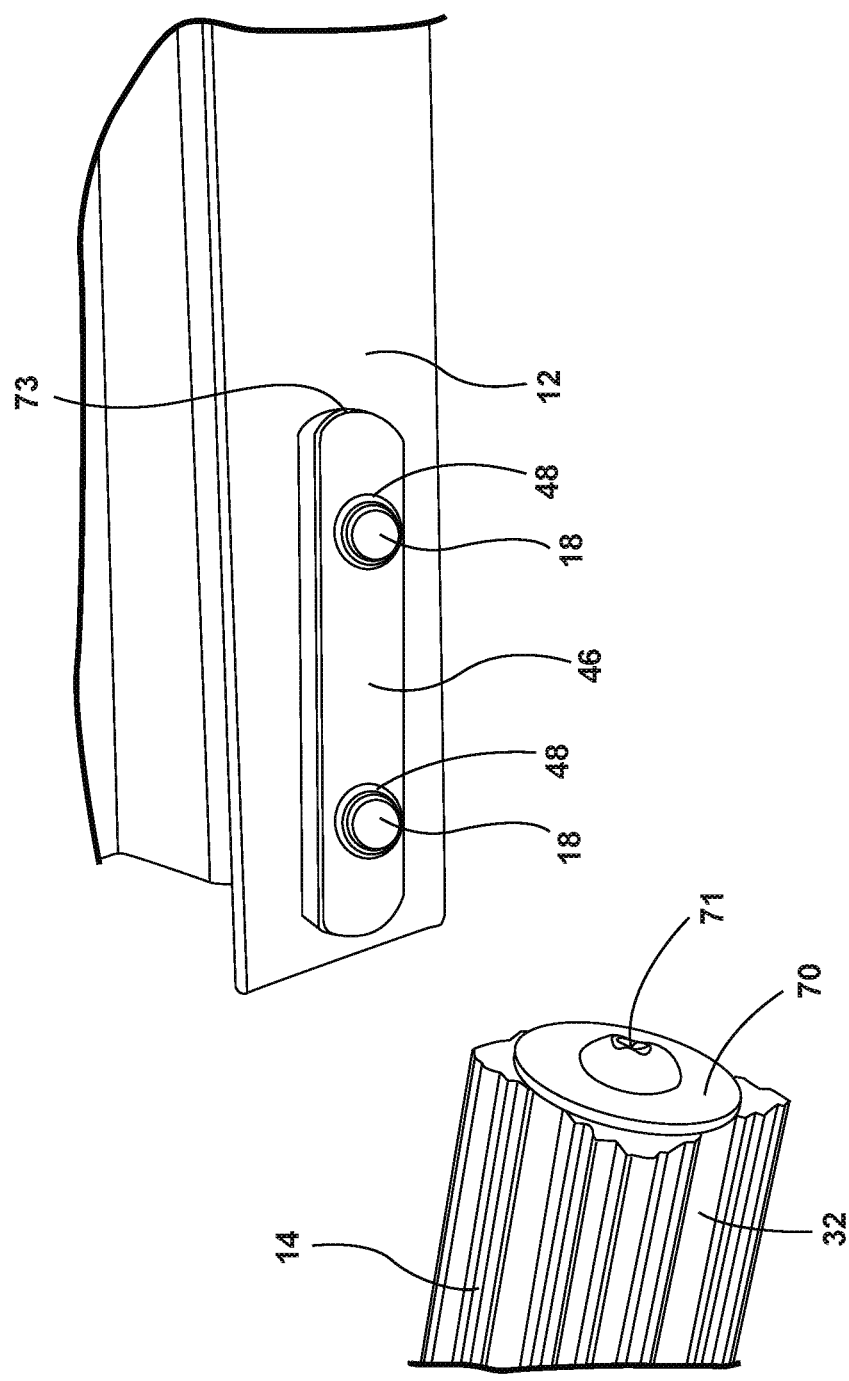
FIG. 12 is a partial perspective view of the first and second beams of the bridge assembly.
Figure 13:
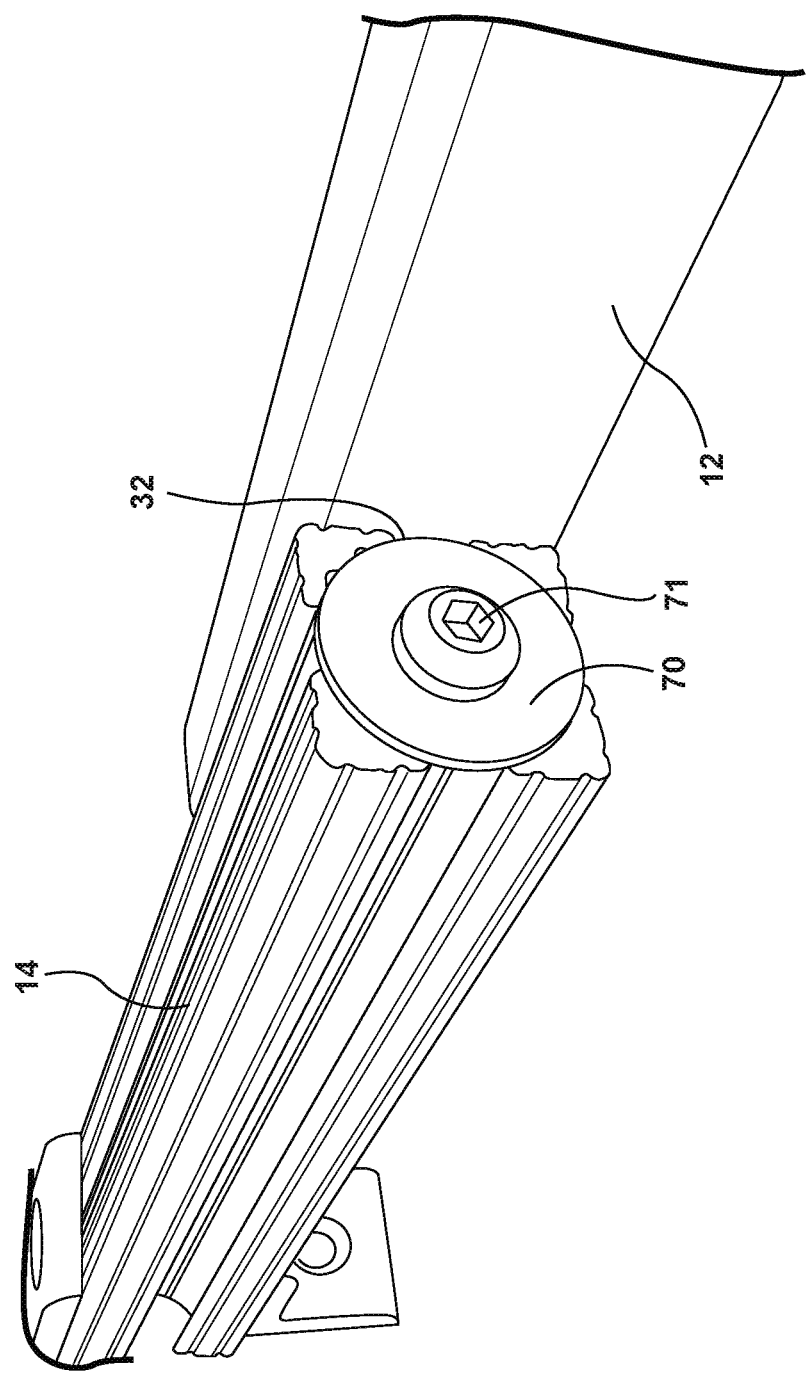
FIG. 13 is a partial perspective view of the first and second beams according to an embodiment of the invention.
Figure 14:
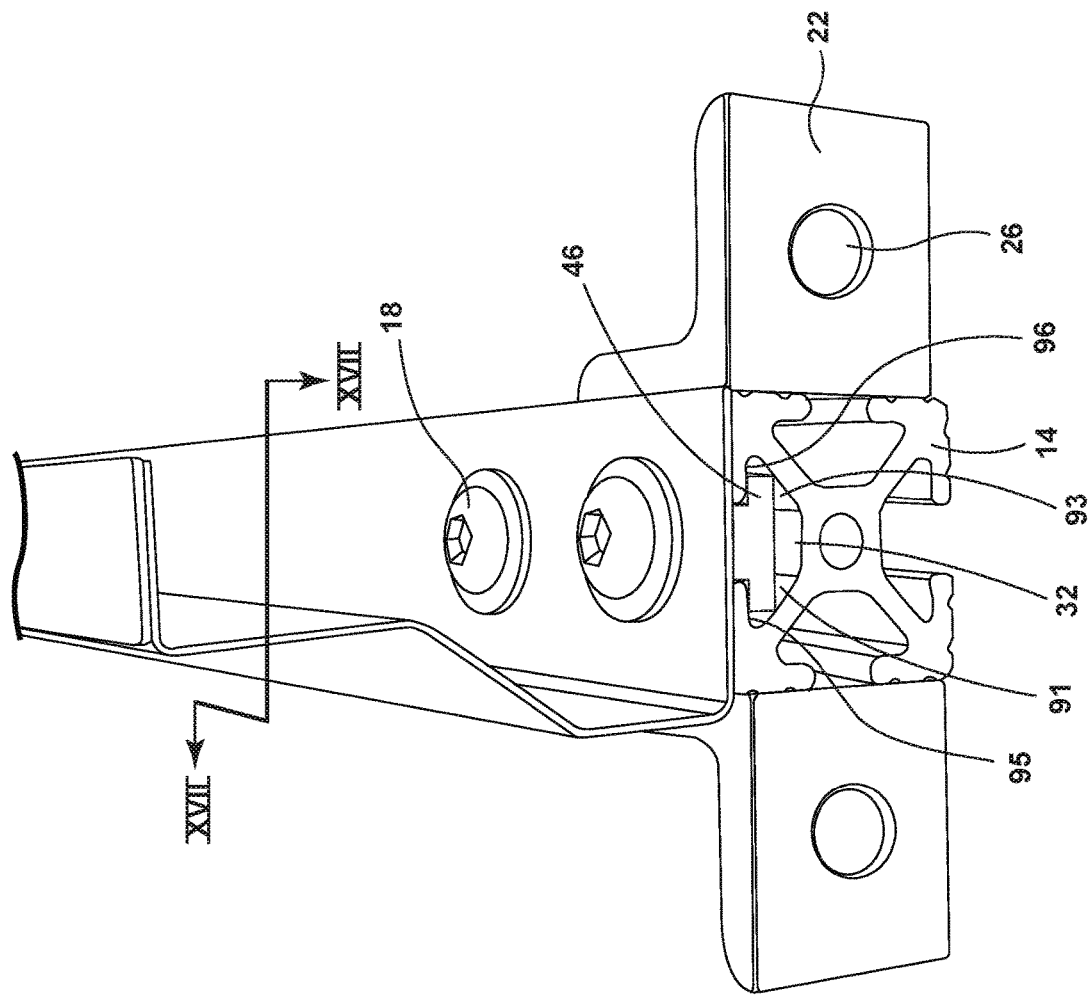
FIG. 14 is a perspective view of the end of the second beam of the bridge assembly.

The second beam 14 may include a stop plate 70 that contacts the radiused edge 73 of plate 46 to limit outward sliding travel between first beam 12 and second beam 14, as illustrated in FIGS. 12-13. The stop plate 70 can be integrally formed with the second beam 14 or can be secured to the second beam using a fastener 71. The third beam 16 may also include a stop plate 70.

The concealed bridge assembly 10 and the methods of installation disclosed are provided by way of example and do not act to limit the concealed bridge assembly 10 to application in a line from front edge of a countertop cutout to the back edge of a countertop cutout. The concealed bridge assembly 10 may, in alternate applications, span cutout spaces from the left edge of a countertop cutout to the right edge of a countertop cutout. Installation as traditional and true-flush examples do not act to limit the concealed bridge assembly 10's potential for other types of styles of installation, including raised installations or lowered installations.

The materials and processes of bridge construction detailed are provided by way of example, and do not act to limit bridge construction, and additional examples being polymers, fiberglass, composites materials, natural materials, and molding, roll forming, stamping, and casting.

The method of countertop cutouts, kerfs, bridges, and installations disclosed are provided by way of example and not limited to cooking appliances, and apply to any suitable item, additional examples being countertop mounted machines, appliances, downdraft ventilations, controls, disposals, power modules, griddles, cleaning appliances, sinks, aesthetic panels, or multiples of or combinations of same.

Those skilled in the art will recognize, or will be able to ascertain using no more than routine experimentation, many equivalents to the specific embodiments of the invention described herein. Such equivalents are intended to be encompassed by the following claims.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

It will be understood by one having ordinary skill in the art that construction of the present disclosure and other components is not limited to any specific material. Other exemplary embodiments of the disclosure disclosed herein may be formed from a wide variety of materials, unless described otherwise herein.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A surface mounted cooktop, comprising:
    at least one cooktop unit;
    a surface with an opening receiving said at least one cooktop unit; and
    a bridge assembly for supporting at least one surface of the at least one cooktop unit, comprising:
        a first beam, having a top surface supporting at least a portion of said at least one cooktop unit and a bottom surface, with a length substantially the same as a width of said opening in said surface, a height, including at least one bend, that is equal to or greater than a thickness of said surface, and wherein said top surface has a width that is less than the width of said bottom surface;
        a second beam, adjacent to and in sliding contact with a portion of said bottom surface of said first beam;
        a third beam, adjacent to and in sliding contact with a portion of said bottom surface of said first beam;
        wherein the first beam has at least one plate that is received in a portion of the second beam;
        at least one fastener that passes through said at least one plate on said first beam to press said plate against a surface of said second beam to permit relative sliding motion between said first and second beams when said at least one fastener is loosened and to prevent relative sliding motion between said first and second beams when said at least one fastener is tightened; and
    fasteners for securing the bridge assembly underneath said surface.

2. The surface mounted cooktop of claim 1, wherein:
    said at least one cooktop further comprises a plurality of cooktops.

3. The surface mounted cooktop of claim 2, wherein:
    said bridge assembly is placed between adjacent cooktop units.

4. The surface mounted cooktop of claim 1, wherein said opening in said surface includes a ledge that is substantially the same as the thickness of a rim of the at least one cooktop unit, and which supports at least a portion of the at least one cooktop unit.

5. The surface mounted cooktop of claim 1, wherein the relative sliding motion of the third beam and first beam is controlled by at least one fastener that passes through a plate on said first beam that is received in a portion of said third beam.

6. The surface mounted cooktop of claim 5, wherein said at least one fastener that passes through a plate on said first beam that is received in a portion of said third beam is threaded.

7. The surface mounted cooktop of claim 1, including cabinet fasteners that extend through brackets in said second and third beams to secure the bridge assembly to a cabinet that supports said surface.

8. The surface mounted cooktop of claim 1, wherein said at least one fastener is threaded.

* * * * *